United States Patent
Eusterwiemann

(10) Patent No.: US 11,673,182 B2
(45) Date of Patent: Jun. 13, 2023

(54) METHOD FOR SUPPLYING A RIVETING MACHINE WITH RIVET ELEMENTS

(71) Applicant: Broetje-Automation GmbH, Rastede (DE)

(72) Inventor: Christoph Eusterwiemann, Oldenburg (DE)

(73) Assignee: Broetje-Automation GmbH, Rastede (DE)

( * ) Notice: Subject to any disclaimer, the term of this patent is extended or adjusted under 35 U.S.C. 154(b) by 205 days.

(21) Appl. No.: 16/500,644

(22) PCT Filed: Mar. 22, 2018

(86) PCT No.: PCT/EP2018/057273
§ 371 (c)(1),
(2) Date: Oct. 3, 2019

(87) PCT Pub. No.: WO2018/184856
PCT Pub. Date: Oct. 11, 2018

(65) Prior Publication Data
US 2020/0108438 A1 Apr. 9, 2020

(30) Foreign Application Priority Data

Apr. 3, 2017 (DE) ...................... 10 2017 107 156.3
May 12, 2017 (DE) ...................... 10 2017 110 401.1
Jul. 5, 2017 (DE) ...................... 10 2017 114 972.4

(51) Int. Cl.
*B21J 15/32* (2006.01)
*B21J 15/02* (2006.01)
(Continued)

(52) U.S. Cl.
CPC ............... *B21J 15/32* (2013.01); *B21J 15/02* (2013.01); *B25J 11/007* (2013.01); *B21J 15/142* (2013.01)

(58) Field of Classification Search
CPC . B21J 15/32; B21J 15/02; B21J 15/142; B25J 11/00; B25J 11/007
See application file for complete search history.

(56) References Cited

U.S. PATENT DOCUMENTS 4,828,159 A * 5/1989 Woods ...................... B21J 15/28
227/112
4,960,360 A * 10/1990 Giannuzzi ............. B23P 19/002
198/380
(Continued)

FOREIGN PATENT DOCUMENTS

CN 105127352 12/2015
CN 105346989 2/2016
(Continued)

OTHER PUBLICATIONS

Mueller et al.; Method of Separating Small Items; May 2, 2013; EPO English Translation; pp. 1-4 (Year: 2021).*
(Continued)

*Primary Examiner* — Bayan Salone
(74) *Attorney, Agent, or Firm* — Pauly, DeVries Smith & Deffner LLC

(57) ABSTRACT

Various embodiments relate to a method for supplying a riveting machine with rivet elements, in particular during operation of the riveting machine, wherein at least one rivet element providing arrangement comprising at least one rivet element providing unit for providing and separating the rivet element is provided, wherein the riveting machine has a rivet element receiving arrangement comprising at least one rivet element receptacle for receiving the rivet elements, wherein at least a part of the transport from one of the rivet element providing units to one of the rivet element receptacles is realized in a robot-based manner.

12 Claims, 6 Drawing Sheets

(51) Int. Cl.
B21J 15/14 (2006.01)
B25J 11/00 (2006.01)

(56) References Cited

U.S. PATENT DOCUMENTS

| | | | | |
|---|---|---|---|---|
| 6,736,255 | B1 * | 5/2004 | Mitzenheim | B65G 47/681 |
| | | | | 198/447 |
| 9,610,632 | B2 * | 4/2017 | Schug | B21J 15/32 |
| 10,981,277 | B2 * | 4/2021 | Pringle, IV | B23P 19/063 |
| 11,033,951 | B2 * | 6/2021 | Eusterwiemann | B21J 15/32 |
| 2002/0178692 | A1 * | 12/2002 | Panzarella | B65B 17/00 |
| | | | | 53/64 |
| 2018/0199477 | A1 * | 7/2018 | Trevisiol | H05K 13/04 |
| 2019/0291171 | A1 * | 9/2019 | Eusterwiemann | B23P 19/001 |

FOREIGN PATENT DOCUMENTS

| | | | | |
|---|---|---|---|---|
| CN | 104827268 | | 3/2017 | |
| DE | 4320282 | A1 * | 12/1994 | B65G 47/14 |
| DE | 102011113832 | | 3/2013 | |
| DE | 102012020981 | A1 * | 5/2013 | B21J 15/32 |
| DE | 102014106312 | | 11/2015 | |
| DE | 102014106312 | A1 * | 11/2015 | G01B 11/02 |
| DE | 102015216093 | | 3/2017 | |
| DE | 102015216093 | A1 * | 3/2017 | B21J 15/32 |
| DE | 102016110914 | | 5/2017 | |
| EP | 2640536 | B1 * | 6/2014 | B21J 15/32 |
| WO | WO-2017089418 | A1 * | 6/2017 | B23P 19/002 |
| WO | 2017194760 | | 11/2017 | |
| WO | WO-2017194760 | A1 * | 11/2017 | B65G 47/14 |
| WO | 2018184856 | | 10/2018 | |
| WO | WO-2018184856 | A1 * | 10/2018 | B25J 11/00 |

OTHER PUBLICATIONS

Rumpler; Apparatus for Setting Blind Rivets; Dec. 22, 1994; EPO English Translation; pp. 1-4 (Year: 2021).*

International Preliminary Report on Patentability for PCT Application No. PCT/EP2018/057273 dated Oct. 17, 2019 (13 pages) with English Translation.

"German Search Report," for German Patent Application No. 102017114972.4 dated Mar. 19, 2019 (10 pages).

"International Search Report and Written Opinion," for PCT Application No. PCT/EP2018/057273 dated Jun. 11, 2018 (11 pages).

* cited by examiner

METHOD FOR SUPPLYING A RIVETING MACHINE WITH RIVET ELEMENTS

CROSS-REFERENCE TO RELATED APPLICATIONS

This application is a national stage application under 35 U.S.C. 371 of International Patent Application Serial No. PCT/EP2018/057273, entitled "METHOD FOR SUPPLYING A RIVETING MACHINE WITH RIVET ELEMENTS," filed Mar. 22, 2018, which claims priority from German Patent Applications No. DE 10 2017 107 156.3, filed Apr. 3, 2017, No. DE 10 2017 110 401.1, filed May 12, 2017, and DE 10 2017 114 972.4, filed Jul. 5, 2017, the disclosures of which are incorporated herein by reference.

FIELD OF THE TECHNOLOGY

The disclosure relates to a method for supplying a riveting machine with rivet elements, a method for producing a structural component, and a production apparatus.

BACKGROUND

From the prior art it is known that rivet elements for filling a rivet cassette are separated by a rivet element providing unit configured as a vibratory spiral conveyor, their alignment is checked, and the rivet elements are then fed to a rivet cassette. A filled rivet cassette is subsequently fed to a rivet magazine of a production apparatus, from where the riveting machine of the production apparatus is supplied with rivet elements.

The filling of the rivet cassettes is relatively complex and is here realized sequentially. If the nature of a rivet element which is due to be filled into the rivet cassettes is changed, the rivet loading device must be adjusted to the new rivet elements. The concept of providing the rivet elements in rivet magazines calls for extensive advance planning and storage of rivet cassettes containing a wide variety of rivet elements.

SUMMARY

The object of the present disclosure is thus to enable a riveting machine to be supplied in a simple and flexible manner with the required rivet elements.

This object is achieved according to the method described herein.

With the method according to the proposal, a riveting machine can be supplied in a particularly simple manner with rivet elements. For this, at least one rivet element providing arrangement comprising at least one rivet element providing unit for providing and separating the rivet elements is provided. The riveting machine has a rivet element receiving arrangement comprising at least one rivet element receptacle for receiving the rivet elements. Because at least a part of the transport from one of the rivet element providing units to one of the rivet element receptacles is realized in a robot-based manner, the riveting machine can be supplied with rivet elements in a particularly simple and flexible manner. The riveting machine can be directly supplied with rivet elements in the form of bulk material, and thus without a magazine.

In various embodiments, embodiments of a robot for transporting the rivet elements, of the riveting machine and of the rivet element providing unit, and the optional incorporation thereof into the method according to the proposal, are described.

A refinement of the method enables a particularly simple feeding of a rivet element to the pick-off region.

Various embodiments provide a transport of the rivet elements from the rivet element receiving arrangement to the end effector.

Various forms of controlling the supplying of the riveting machine with rivet elements are described. They enable the riveting machine to be supplied in a particularly flexible manner also with different rivet elements.

According to various embodiments, the control system can by a sensor arrangement detect or check a rivet element provided by the rivet element providing unit.

Furthermore, the object described in the introduction is achieved in a method for producing a structural component described herein.

As previously described, a riveting machine is supplied with rivet elements, wherein, by the rivet element receiving arrangement, the rivet elements are fed to an end effector of the riveting machine, and a hole is drilled into the structural component, and a rivet element fed to the end effector is inserted and riveted into the hole. The same advantages are obtained as previously already described in connection with the method for supplying a riveting machine with rivet elements.

Moreover, the object stated in the introduction is achieved by a production apparatus as described herein.

The production apparatus is designed to implement the previously described method. Accordingly, reference is made in this respect to the previously described features of the methods.

Various embodiments of the production apparatus, in particular concerning the robot, the riveting machine with the thereto assigned rivet element receiving arrangement, and the rivet element providing unit are described.

Various embodiments provide a method for supplying a riveting machine with rivet elements, in particular during operation of the riveting machine, wherein at least one rivet element providing arrangement comprising at least one rivet element providing unit for providing and separating the rivet elements is provided, wherein the riveting machine has a rivet element receiving arrangement comprising at least one rivet element receptacle for receiving the rivet elements, wherein at least a part of the transport from one of the rivet element providing units to one of the rivet element receptacles is realized in a robot-based manner.

In various embodiments, the rivet elements are transported from one of the rivet element providing units to one of the rivet element receptacles by a robot having at least two or at least three axes.

In various embodiments, the riveting machine has an adjusting unit having an end effector with a riveting tool, and the riveting tool sets the rivet element, wherein the end effector has a drilling tool and a riveting tool, and the drilling tool drills a hole into a structural component and the riveting tool sets a rivet element into the drilled hole.

In various embodiments, the rivet element providing unit has a spiral conveyor, by means of which the rivet elements are fed to a pick-off region, wherein the spiral conveyor has a spiral and a longitudinal axis, about which the spiral extends, further wherein the longitudinal axis is inclined to the direction of gravity, further wherein a chute is provided, over which the rivet elements slide to the pick-off region, further wherein, by a rotation of the spiral, a rivet element is fed, by discharging of this same and sliding over the chute, from the spiral conveyor to the pick-off region.

In various embodiments, the rivet elements in the rivet element providing unit are separated and fed to a pick-off region, further wherein the rivet elements in the pick-off region are picked off in a robot-based manner.

In various embodiments, the rivet elements are transported from the rivet element receiving arrangement to the end effector on a transport path, wherein the transport path is at least partially tube-bound, wherein a partial transport path from the rivet element receiving arrangement to the adjusting unit is tube-bound, further wherein, at least on this partial transport path, the rivet elements are transported by means of an underpressure and/or overpressure.

In various embodiments, the supplying of a riveting machine with rivet elements is controlled by a control system, wherein the control system, by means of a sensor arrangement, in particular an optical sensor, detects the rivet elements, further wherein the control system, by means of the optical sensor, detects the position and/or alignment of the rivet elements in one of the rivet element providing units, in particular in the pick-off region, further wherein the control system, on the basis of the position and/or alignment of the rivet elements, activates the robot to receive a rivet element.

In various embodiments, the control system, by means of the sensor arrangement, in particular by means of the optical sensor, detects the type of a rivet element provided by the rivet element providing unit, in particular lying in the pick-off region, wherein the control system checks whether the detected type is constituted by a desired type to be fed to one of the rivet element receptacles.

In various embodiments, predetermined characteristics, relevant to the drilling process and/or the riveting process, of the rivet elements are detected prior to feeding to the rivet element receiving arrangement.

In various embodiments, one of the characteristics relevant to the drilling process and/or the riveting process, is the rivet length and/or the shank diameter and/or the shank length.

In various embodiments, the control system, by means of the sensor arrangement, in particular by means of the optical sensors, checks the rivet elements for damage.

Various embodiments provide a method for producing a structural component, in particular an aircraft structural component, wherein a riveting machine, by the method as described herein, is supplied with rivet elements, and wherein, from the rivet element receiving arrangement, the rivet elements are fed to an end effector of the riveting machine, and wherein a hole is drilled into the structural component, and a rivet element fed to the end effector is inserted into the hole and riveted.

In various embodiments, the production apparatus has a riveting machine having a rivet element receiving arrangement, a rivet element providing arrangement comprising at least one rivet element providing unit for providing and separating rivet elements, and a robot for at least partially transporting the rivet elements from one of the rivet element providing units to one of the rivet element receptacles.

In various embodiments, the rivet element providing unit has a spiral conveyor, by means of which the rivet elements are fed to a pick-off region, wherein the spiral conveyor has a spiral and a longitudinal axis about which the spiral extends, further wherein the longitudinal axis is inclined to the direction of gravity, further wherein a chute is provided, over which the rivet elements slide to the pick-off region, further wherein, by a rotation of the spiral (5e), a rivet element is fed from the spiral conveyor, by discharging of this same and sliding over the chute, to the pick-off region.

In various embodiments, the robot has at least two or at least three axes, wherein the robot transports the rivet elements from one of the rivet element providing units to one of the rivet element receptacles.

In various embodiments, the robot is fastened to the riveting machine, or wherein the robot is set up separately from the riveting machine.

In various embodiments, the riveting machine has an adjusting unit having an end effector with a riveting tool, wherein the end effector has a drilling tool and a riveting tool.

In various embodiments, the rivet element providing unit is fastened to the riveting machine, or wherein the rivet element providing unit is set up separately from the riveting machine.

In various embodiments, the rivet element receiving arrangement is fastened to the riveting machine, wherein the rivet element receiving arrangement is fastened to a stationary part of the riveting machine.

BRIEF DESCRIPTION OF THE DRAWINGS

The disclosure is described in greater detail below with reference to a drawing representing just one illustrative embodiment. In the drawing.

DETAILED DESCRIPTION

Figure 1:
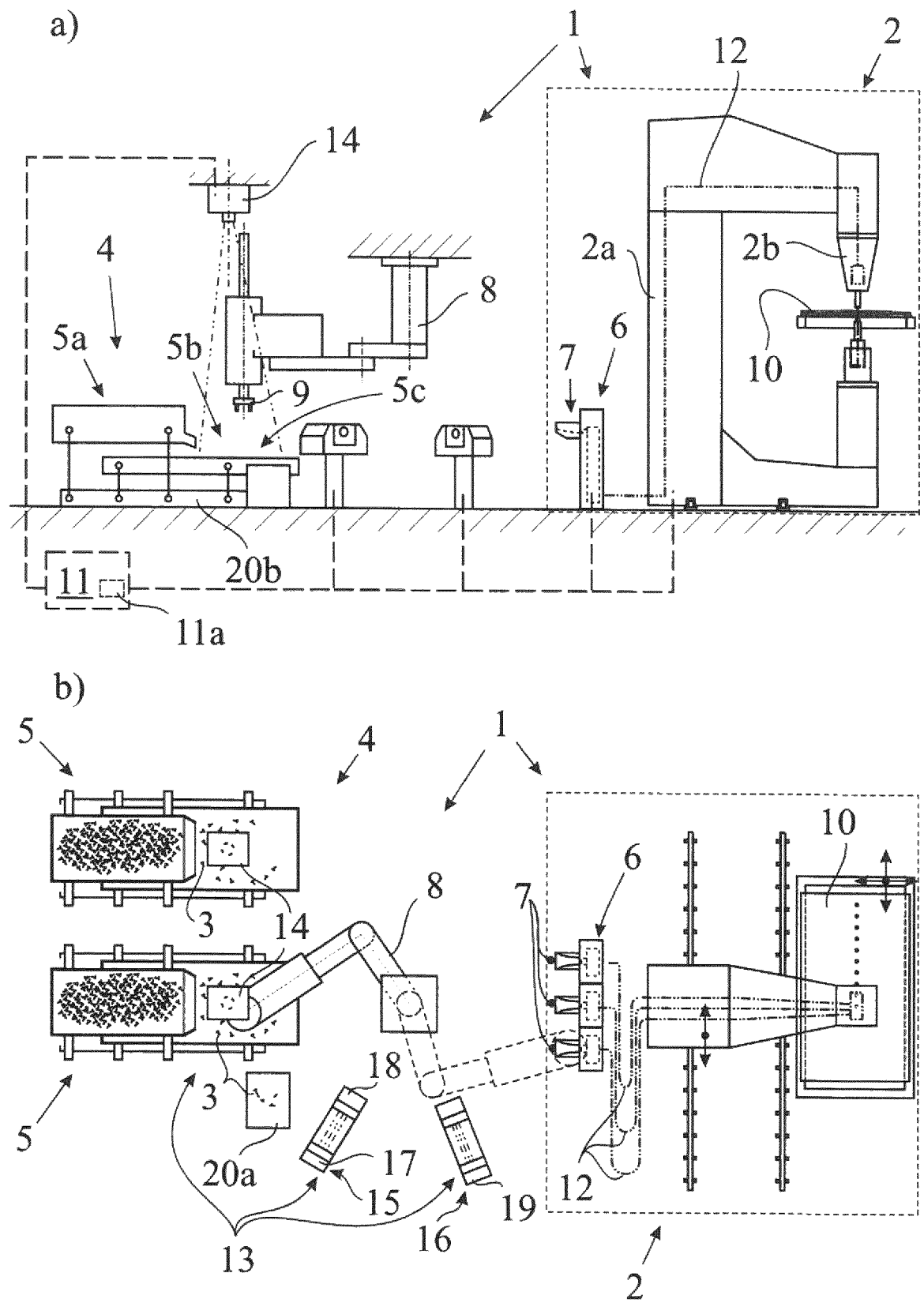
FIG. 1 shows a schematic representation of a first illustrative embodiment of a production apparatus according to the proposal for implementing a method according to the proposal, in a) a side view and b) a top view.

In FIG. 1, a production apparatus 1 according to the proposal is shown. The production apparatus 1 has a riveting machine 2, which, by means of the proposed method, is supplied with rivet elements 3, in particular during operation of the riveting machine 2.

In addition, a rivet element providing arrangement 4 comprising at least one rivet element providing unit 5 for providing and separating the rivet elements 3 is provided. Here, the rivet element providing unit 5 is, or the rivet element providing units 5 are, set up separately from the riveting machine 2. Alternatively, this or these can be fastened to the riveting machine 2, and thus be part of the riveting machine 2.

The riveting machine 2 has a rivet element receiving arrangement 6 comprising at least one rivet element receptacle 7 for receiving the rivet elements 3. In the rivet element receptacle 7 or the rivet element receptacles 7, the rivet elements 3 are here received in aligned, in particular positionally secured arrangement.

Here, the rivet element receiving arrangement 6 is fastened to the riveting machine 2, in particular to a stationary part of the riveting machine 2.

According to the proposal, a part of the transport from one of the rivet element providing units 5 to one of the rivet element receptacles 7 is realized in a robot-based manner. The robot-based transport is here realized by means of a robot 8. The robot 8 and the rivet element providing unit 5 are here assigned to a rivet element supply unit which has these.

The robot 8 is here constituted by a robot 8 having at least two or at least three axes. The robot 8 can also have four or more axes. Particularly, the robot 8 has at least two or at least three rotational axes. Particularly, the robot 8 is constituted by an industrial robot, in particular a Scara robot (Selective Compliance Assembly Robot Arm). It is also referred to as a "horizontal articulated arm robot". Here, the robot 8 is set up separately from the riveting machine 2. Alternatively, the robot 8 can, however, also be fastened to the riveting machine 2, and thus be part of the riveting machine 2. In the illustrative embodiment of FIG. 5, the robot 8 is suspended from a, in particular fixed, gantry 8a.

Because a robot 8 here removes the rivet elements 3 from the rivet element providing unit 5 and feeds them to one of the rivet element receptacles 7, many different rivet elements 3 can be handled in a simple manner and fed to the rivet element receptacle 7 or the rivet element receptacles 7.

The rivet elements 3 can be constituted, for instance, by rivets 3a and/or rivet collars 3b and/or spacers 3c.

In various embodiments, with the robot 8, rivets 3a of different generic type, in particular of different type, and/or different nominal length and/or different nominal diameter can be fed, without change of mechanical configuration of the production apparatus 1, to one of the or the rivet element receptacles 7. The type of a rivet element 3 differs from the generic type thereof insofar as the generic type determines the nature of the rivet, rivet collar and/or spacer, yet is not defined in terms of the dimensioning of its features, in particular in terms of its nominal dimensions. The type of a rivet element 3 specifies not only the generic type, but also the nominal dimensions of the rivet element 3, thus, in particular, the nominal diameter and the nominal length.

Additionally or alternatively, rivet collars 3b of different generic type, in particular of different type, and/or of different nominal length and/or of different nominal diameter, can be fed by the robot, without change of mechanical configuration of the production apparatus 1, to one of the or the rivet element receptacles 7.

It is therefore also possible to feed rivets 3a and rivet collars 3b by the robot 8, without change of mechanical configuration of the production apparatus 1, to one of the or the rivet element receptacles 7.

The same applies, here, also to spacers 3c. Also spacers 3c of different generic type, in particular of different type, and/or of different nominal length and/or of different nominal diameter, can be fed by the robot 8, without change of mechanical configuration of the production apparatus 1, to one of the or the rivet element receptacles 7.

This is achieved through the use of the robot 8. This can grip with its gripper 9, in particular a two-fingered gripper, the rivet elements 3 of very different design, and feed them in a secure and aligned, in particularly positionally defined manner, to the rivet element receptacles 7. In particular, all rivet elements 3 fed to the rivet element receiving arrangement 6 can be received, aligned and fed to the rivet element receiving arrangement 6 by the robot 8. In various embodiments, all rivet elements 3 can therefore be aligned on the transport path from one of the rivet element providing units 5 to the respective rivet element receptacle 7. Their alignment does not have to be checked prior to reception into the rivet element receptacle 7, nor, in the event of a misalignment, do they therefore have to be turned or fed back to the rivet element providing unit 5.

Figure 2:
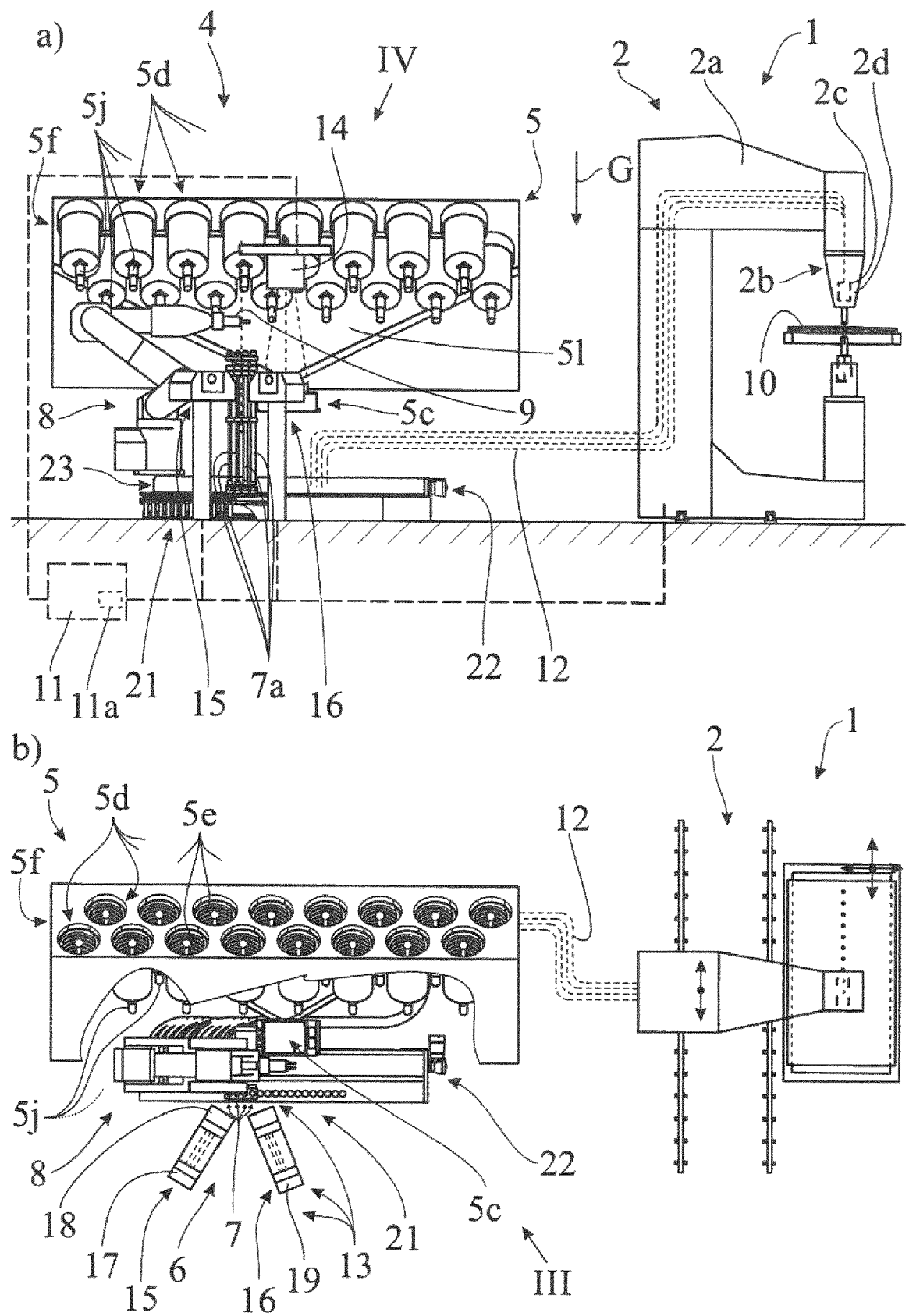
FIG. 2 shows a schematic representation of a further illustrative embodiment of a production apparatus according to the proposal for implementing a method according to the proposal, in a) a side view and b) a top view.

As shown in FIGS. 1 and 2, the riveting machine 2 here has an adjusting unit 2a having an end effector 2b. The end effector 2a has a riveting tool for setting rivet elements 3 into a structural component 10 and, where appropriate, a drilling tool for drilling a hole into a structural component 10. The structural component 10 can be constituted, in particular, by an aircraft structural component, for instance a fuselage section and or an outer skin section. Into a hole drilled by the drilling tool, the riveting tool can then insert a rivet element 3.

For the controlling of the supplying of the riveting machine 2 with rivet elements 3, there is further provided a control system 11. The control system 11 can here be centrally or decentrally configured, thus either have a central control unit or a plurality of decentral control units. The control system 11 here controls the rivet element providing arrangement 4 and the robot 8, as well as, where appropriate, the rivet element receiving arrangement 6 and/or the riveting machine 2.

For the provision of the rivet elements 3, the rivet element providing unit 5 is here configured as a separation unit. To the rivet element providing unit 5, the rivet elements 3 are fed, such as bulk material, such as out of an outer packaging. By the control system 11, information concerning the rivet elements 3, in particular information concerning the rivet elements which is connected to the outer packaging, 3, can be detected. This can concern, for instance, the type of the rivet elements 3, and/or geometric target dimensions and/or batch information. Accordingly, the information concerning the rivet elements 3 can comprise specifications of the rivet elements 3. The detection of this information can be realized, for instance, by means of a barcode scanner and/or a RFID reader. Furthermore, a manual inputting and/or selection by an operator is also possible, however.

In this way, reference information, in particular nominal dimensions of the rivet elements and, where appropriate, batch-specific tolerance ranges, for which the rivet elements 3 can be checked, can be established.

The rivet element providing unit 5 in the illustrative embodiments of FIGS. 1 and 2 has a storage region 5a for the reception and storage of rivet elements 3. In addition, a separation region 5b for the separation of the rivet elements 3 and a pick-off region 5c in the rivet element providing unit 5 is here provided. In the illustrative embodiment of FIG. 1, the separation region and the pick-off region 5c merge fluidly one into the other. In the pick-off region 5c, the rivet elements 3 are here arranged chaotically, but in separated array, for picking-off by the robot 8.

In the illustrative embodiment of FIG. 1, the rivet element providing unit 5, in particular by vibrating motions, for the provision of rivet elements 3, pours some rivet elements 3 out of the storage region 5a into the separation region 5b, from where the rivet elements 3, in particular by vibrating motions, are separated and fed to the pick-off region 5c. From the pick-off region 5c, the rivet elements 3 are then picked off in a robot-based manner, thus in particular by the robot 8.

Figure 3:
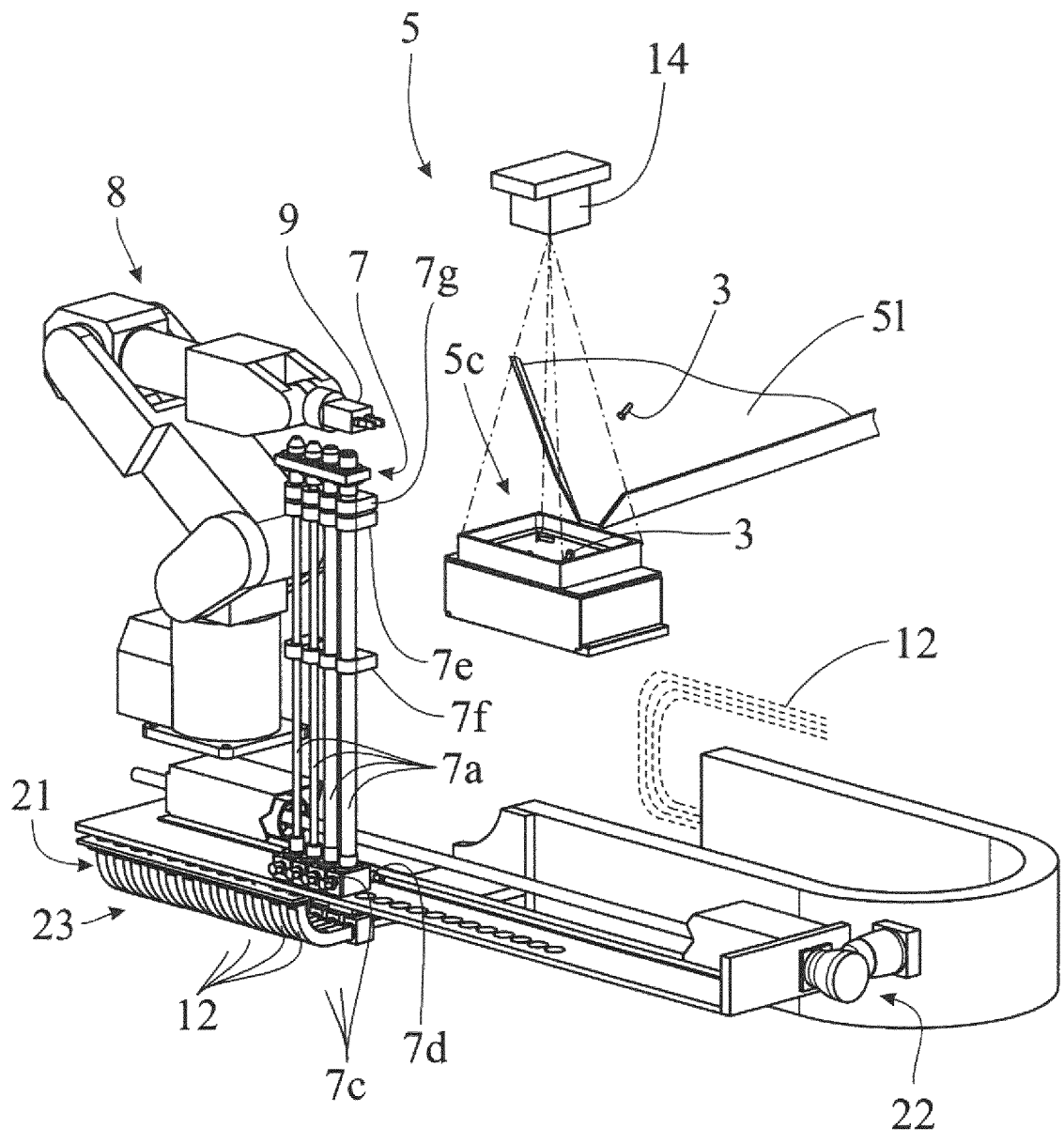
FIG. 3 shows a three-dimensional representation of a part of the production apparatus according to the proposal, according to the direction of view III from FIG. 2.
Figure 4:
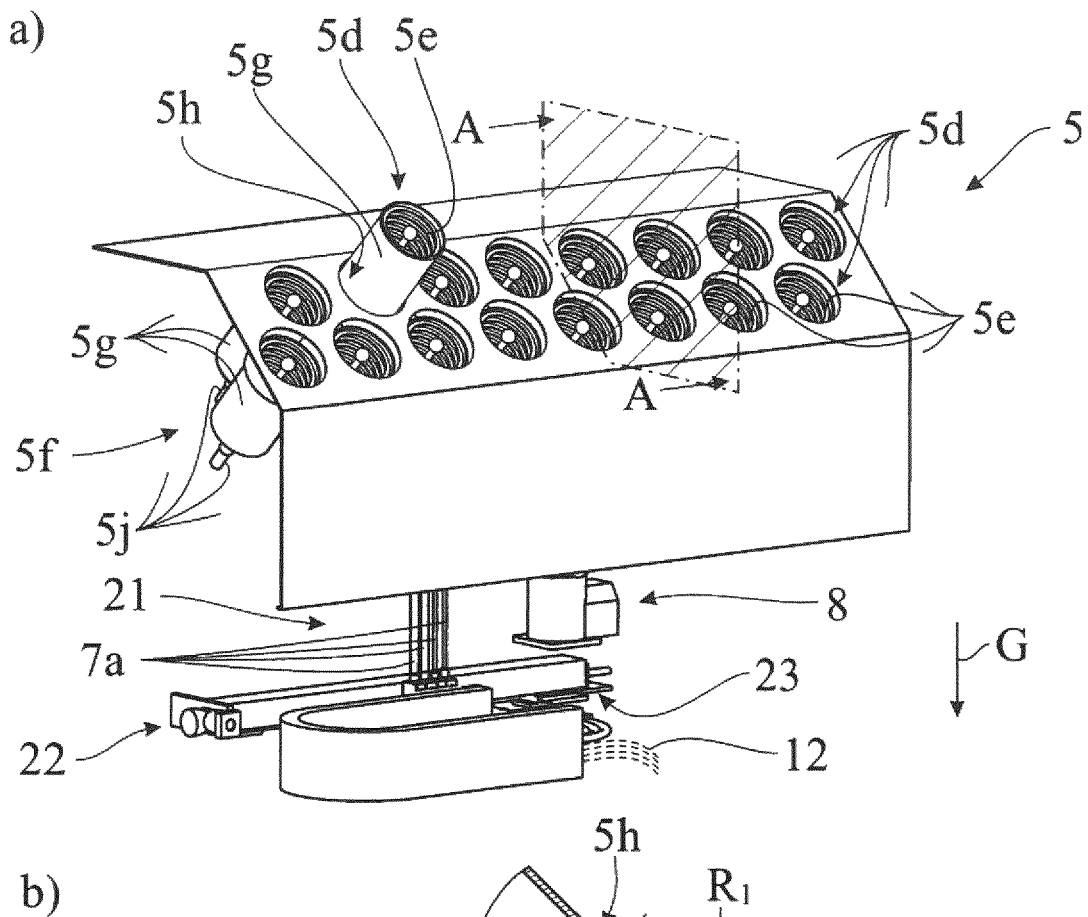
FIG. 4 shows in a) a three-dimensional representation of a part of the production apparatus according to the proposal, according to the direction of view IV from FIG. 2, and in b) a section according to A-A from FIG. 4a)
Figure 4:
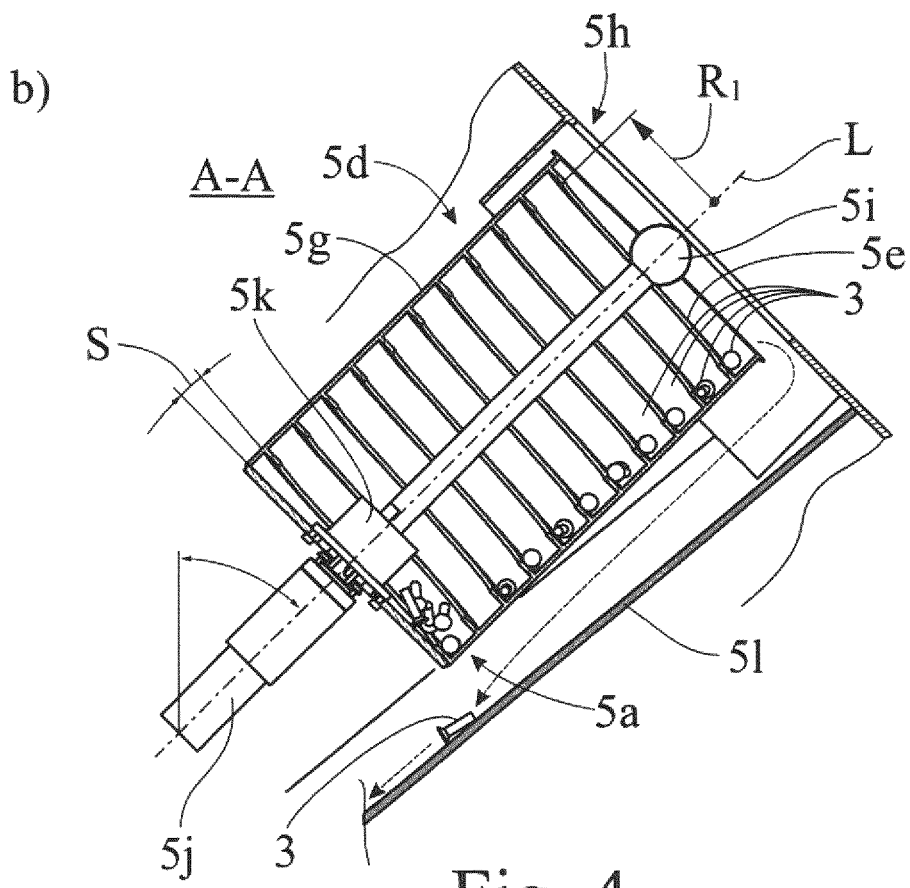
Figure 5:
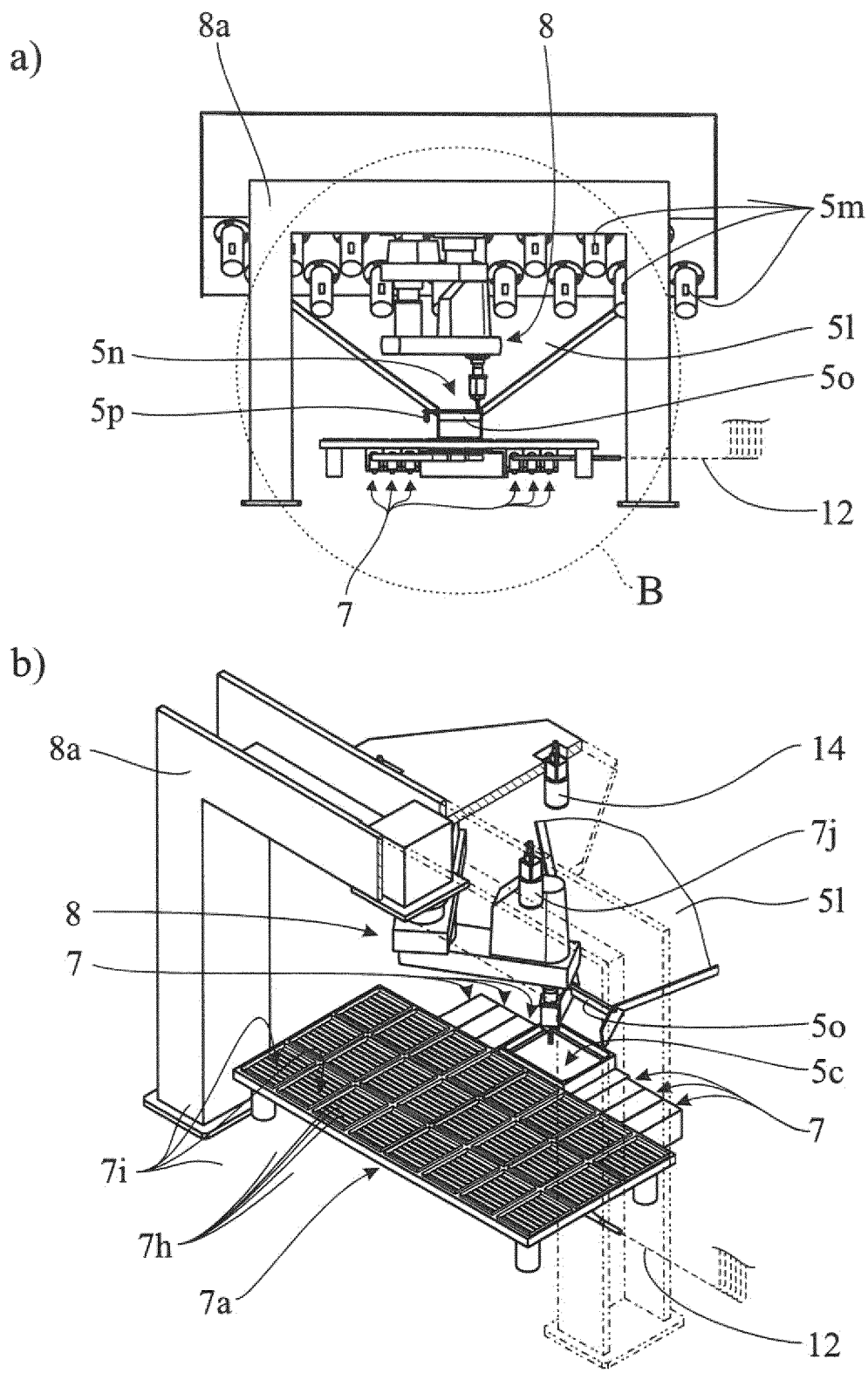
FIG. 5 shows a schematic representation of a further illustrative embodiment of a rivet loading station according to the proposal for implementing a method according to the proposal, a) in a side view and b) in a perspective view.
Figure 6:
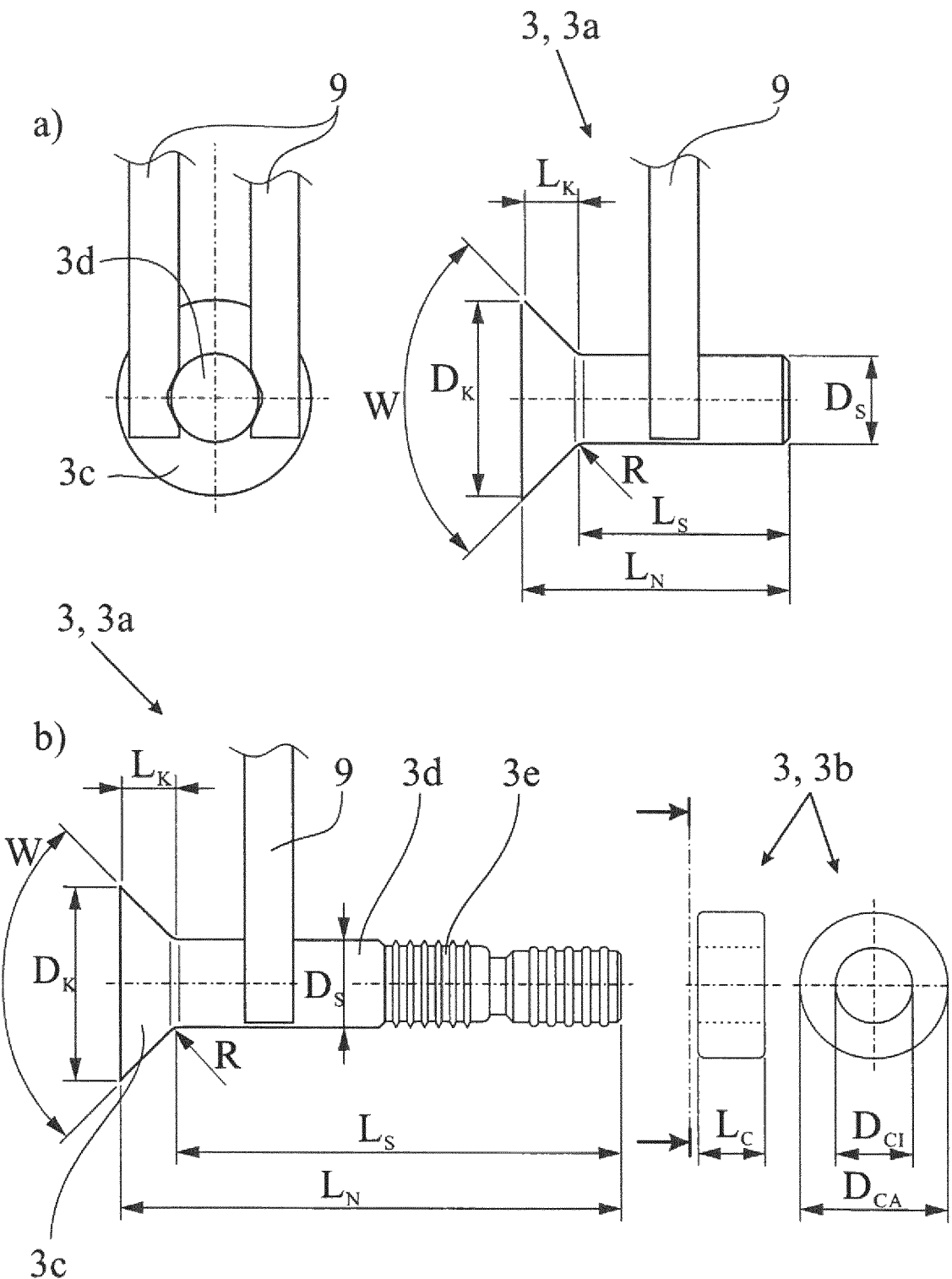
FIG. 6 shows, by way of example, rivet elements gripped by a gripper of a robot of the production apparatus from FIG. 1.

In the illustrative embodiment of FIGS. 2 to 4 and in the illustrative embodiment of FIG. 5, the rivet element providing unit 5 has a spiral conveyor 5d, by means of which the rivet elements 3 are fed to a pick-off region 5c.

The spiral conveyor 5d has a spiral 5e and a longitudinal axis L, about which the spiral 5e extends. When used in normal operation, the spiral conveyor 5d is arranged such that the longitudinal axis L, as shown in FIGS. 2 and 4, is inclined to the direction of gravity G.

In particular, in order to provide rivet elements 3 of very different type and/or of very different generic type, the rivet element providing unit 5 can have a plurality of spiral conveyors 5d, as is the case also in the illustrative embodiment of FIGS. 2 to 4 or the illustrative embodiment of FIG. 5. If a plurality of spiral conveyors 5d are provided, these form a spiral conveyor arrangement 5f. Also in the further spiral conveyors 5d, the spiral 5e thereof, in some embodiments, extends about their respective longitudinal axis L. The longitudinal axes L of at least two, all spiral conveyors are here inclined to the direction of gravity G. Here, as can clearly be seen in FIG. 2 or 4, the longitudinal axes L of the spiral conveyors 5d are aligned substantially parallel to one another. A quite particularly compact arrangement is obtained. Particularly, the spiral conveyors 5d of a rivet element providing unit 5 are of substantially structurally identical configuration.

In various embodiments, the longitudinal axis L or longitudinal axes L run(s) at an angle of 15° to 75°, further of 30° to 60°, further of 40° to 50°, to the direction of gravity G.

The pitch angle S of the spiral 5e here amounts to below 20°, further below 10°. Particularly, the pitch angle amounts to between 2.5° and 7.5°. In the illustrative embodiment, they are 5°.

The robot 8 transports the rivet elements 3 from the pick-off region 5c to the rivet element receptacle 7. The rivet element supply unit can in this way feed the rivet elements 3 particularly flexibly to a rivet element receptacle 7, in particular in alignment. As in the illustrative embodiment shown, a plurality of rivet element receptacles 7 can also be provided. These then form a rivet element receiving arrangement 6.

The combination of the rivet providing unit 5 with a spiral conveyor 5d, in conjunction with a robot 8, enables rivet elements 3 to be fed in a particularly flexible manner to a rivet element receptacle 7. The spiral conveyor 5d enables a quite particularly simple separation and feeding to the pick-off region 5c, while the robot 8 can then feed the rivet elements 3, in particular of very different generic type or very different type, in aligned arrangement to the rivet element receptacle 7. The rivet element receptacle 7 then receive these in aligned, in particular positionally secured arrangement. A mechanical change of configuration of the rivet element supply unit for adaptation to other rivet elements 3 is not necessary.

An enlarged representation of a spiral conveyor 5d can be seen from FIG. 4b according to the section A-A. The spiral conveyor 5d has a spiral pot 5g for receiving rivet elements 3. In this is arranged the spiral 5e. The spiral pot 5g is here of substantially cylindrical configuration. It has proved particularly valuable if the spiral pot 5g and the spiral 5e are configured in one piece, and/or the spiral 5e substantially has a constant radius $R_1$, as is shown in the illustrative embodiment of FIG. 4.

The spiral pot 5g enables rivet elements 3 to be fed to the spiral conveyor 5d in the form of bulk material. This can then be stored in the bottom region of the spiral conveyor 5d—the storage region 5a. Through the rotation of the spirals 5e, the rivet elements 3 can be transported by the spiral 5e, out of the storage region, in the direction of the inlet opening of the spiral conveyor 5d. The rivet elements 3 here slide down on the spiral 5e. Moreover, the rivet elements 3 are hereupon separated on the spiral 5e, at least into groups.

As shown in FIG. 4a, the spiral conveyor 5d has a spiral pot receptacle 5h for receiving the spiral pot 5g. Here, the spiral pot 5g is arranged, in particular without tools, detachably in the spiral pot receptacle 5h. Here it can easily be inserted, as shown in FIG. 4, into the spiral pot receptacle 5h, or withdrawn therefrom. This enables a particularly simple replenishment of rivet elements 3. The spiral pot 5g can be easily removed and then filled with rivet elements 3. After this, it can be reinserted into the spiral pot receptacle 5h. Alternatively, the spiral pot 5g can also be exchanged for a further, already filled spiral pot 5g. This enables a still speedier replenishment of the rivet providing unit 5 with rivet elements 3.

In addition, the spiral conveyor 5d, a spiral pot receptacle 5h, further the majority of the spiral pot receptacles 5h, further each spiral pot receptacle 5h, can have a spiral pot sensor 5m, which recognizes whether a spiral pot 5g is accommodated and/or which rivet elements 3 are present in the spiral pot 5g. This recognition is here realized via a marking of the spiral pot 5g, which marking is sensed by the spiral pot sensor 5m. This can be constituted, for instance, by a barcode, QR code and/or a RFID chip.

In order to facilitate the removal of the spiral pot 5g, the spiral pot 5g has a handle for the gripping and extraction of the spiral pot 5g from, or introduction of the spiral pot 5g into, the spiral pot receptacle 5h. Here, the handle 5i is arranged on the longitudinal axis L of the spiral conveyor 5d in the spiral pot 5g. It is designed as a spherical head.

For the transmission of a rotary motion from a drive 5j to the spiral pot 5g or spiral pots 5g, a coupling 5k can be provided. The coupling 5k is here constituted by a claw coupling, which, in particular, is also configured as a plug-in coupling. To this end, the spiral pot 5g has a claw unit, and the spiral pot receptacle 5h has a corresponding claw unit of the coupling 5k.

Here, each spiral conveyor 5d has an own drive 5j. Correspondingly, all spiral conveyors 5d can here be activated and driven individually. Alternatively, it is also conceivable, however, that a drive 5j is provided for a plurality of spiral conveyors 5d. In this case, the drive force of a drive 5j can be transmitted, for instance by means of a belt, toothed belt or the like, from the drive to a plurality of spiral conveyors 5d.

By the driving of the spiral pot 5g, the spiral 5e too is rotated. The rotation of the spiral 5e has the effect that the rivet elements 3 are conveyed out of the storage region 5a of the spiral pot 5g, through the spiral 5e, in the direction of the opening in the spiral pot 5g. Here, the opening in the spiral pot 5g is found on the upper end face of the same. On the conveying path in the spiral pot 5g, the rivet elements 3 are separated, in particular into small groups. As a result, through rotation of the spiral pot 5g, an, in particular, single discharge of the rivet elements 3, here over a discharge edge of the spiral pot 5g, from the spiral pot 5g is possible.

Here, and as can be seen in particular in FIG. 4, the rivet elements 3 are conveyed through the spiral 5e out of the spiral conveyor 5d. Here, the spiral pot receptacle 5h has an opening for feeding of the rivet elements 3 to the pick-off region 5c. Through this opening, the rivet elements 3 fall out of the spiral conveyor 5d. Here, there is then provided a chute 5*l*, over which the rivet elements 3 slide to the pick-off region 5*c*. Accordingly, by a rotation of the spiral 5*e*, a rivet element 5, through the discharging thereof and sliding over the chute 5*l*, is fed by the spiral conveyor 5*d* to the pick-off region 5*c*.

As shown, by way of example, in FIG. 5, before the pick-off region can be provided a rivet element collecting region 5*n*. In this, rivet elements 3, prior to the separation for pick-off by the robot 8, can be collected in order to feed these jointly to the pick-off region 5*c*. In the illustrative embodiment, the rivet element collecting region 5*n* has a flap 5*o*. This can here be actuated by means of an actuator 5*p*. The chute 5*l* here has the flap 5*o* and the actuator 5*p*. Through the collection and joint feeding of the rivet elements 3 to the pick-off region 5*c*, the rivet elements 3 can be fed in a particularly simple manner speedily to the pick-off region 5*c*, and there separated and picked off. The collection of the rivet elements 3 is here realized by the closed flap 5*o*, and/or the joint feeding of the collected rivet elements 3 to the pick-off region by the opening of the flap 5*o*.

In various embodiments, rivet elements 3 are fed to the pick-off region 5*c* by a plurality of or all, spiral conveyors 5*d*. Here, the rivet elements 3 are fed via a common chute 5*l* to the pick-off region 5*c*. However, also a plurality of chutes 5*l* from various spiral conveyors 5*d* to the pick-off region 5*c* can be provided. In some embodiments, however, a plurality of spiral conveyors 5*d* convey rivet elements 3 to the pick-off region 5*c*.

Additionally or alternatively to the opening in the spiral pot receptacle 5*h*, the spiral pot 5*g* too can have an opening for feeding of the rivet elements 3 to the pick-off region 5*c*.

The pick-off region 5*c* is here formed by a vibrating table. The latter ensures a reliable pick-off by the robot 8, even where a plurality of rivet elements 3 are fed simultaneously to the pick-off region 5*c*. Where appropriate, in the pick-off region 5*c*, non-separated horizontal rivet elements 3 can be separated, or further isolated, by vibrating motions.

From the pick-off region, the rivet elements 3 are fed by means of the robot 8, optionally singly, in aligned, in particular positionally secured arrangement, to the rivet element receptacle 7, and received, in aligned, optionally positionally secured arrangement, by the rivet element receptacle 7. Just one rivet element receptacle 7 can be provided, though optionally a plurality of rivet element receptacles 7 are provided. In the illustrative embodiment, four rivet element receptacles 7 are shown.

The rivet element receptacle 7 has, or the rivet element receptacles 7 have, here a, in particular respectively one, temporary store 7*a* for the temporary storage of rivet elements 3. If a plurality of temporary stores 7*a* are provided, these optionally form a temporary store arrangement 7*b*. In the temporary store 7*a* are also stored the rivet elements 3, here in aligned, in particular positionally secured arrangement.

In various embodiments, the temporary store 7*a* has at least one, or at least two slider(s) 7*c*, 7*d*, for blocking or releasing rivet elements 3 for conveyance to the riveting machine 3, in particular to the riveting tool 2*c*. Two sliders 7*c*, 7*d* enable a quite simple release of precisely one rivet element 3 at a time for conveyance to the riveting machine 2.

In addition, the temporary store 7*a* can have fill height sensors 7*e*, 7*f* Here, there is provided a fill height sensor 7*e*, which detects that a predetermined fill height has been reached, and/or there is provided a fill height sensor 7*f,* which detects that a predetermined fill height of the temporary store 7*a* has been fallen below. The control system 11 optionally controls the rivet element providing unit 5, at least also on the basis of the fill height of the temporary store 7*a*. In the illustrative embodiment, the fill height sensors 7*e*, 7*f* are arranged displaceably on the temporary store 7*a*, so that the fill height level can be adjusted.

In the illustrative embodiment of FIGS. 2 and 3, the temporary store 7*a* is optionally of tubular and/or pipe-like configuration. This is shown in FIG. 3, where the temporary stores 7*a* are formed by tubes. The fill height sensors are here configured as inductive ring sensors. In this illustrative embodiment, the rivet elements 3 are received by the rivet element receptacle or receptacles 7 and subsequently fed to the temporary store 7*a*.

In the illustrative embodiment of FIG. 5 too, a temporary store 7*a* is provided. Here, a rivet element 3 is fed either directly from the pick-off region 5*c* to the rivet element receptacle 7, or the respective rivet element 3 is firstly fed to the temporary store 7*a*. After it has been fed to the temporary store 7*a*, it can at a subsequent point, in particular when it is needed, be removed from the temporary store 7*a* and fed to the rivet element receptacle 7.

The temporary store 7*a* has rivet element storage spaces 7*h* for individual rivet elements 3, in particular for the individual, positionally secured storage of the rivet elements 3. Here, the robot 8 can fill the rivet element storage spaces 7*h* individually and/or, from the rivet element storage spaces 7*h*, feed rivet elements 3 to a rivet element receptacle 7, in particular for onward transport to the end effector 2*b*. The temporary store 7*a* is here of flat configuration.

In various embodiments, in a memory of the control system 11 is stored which rivet element 3 is deposited on which rivet element storage space 7*h*. As a result, the rivet element 3, when required, can be removed in a simple manner from the robot 8 and fed to the rivet element receptacle 7 for onward transport to the end effector 2*b*.

In the illustrative embodiment of FIG. 5, various rivet element storage spaces 7*h* are respectively combined in a rivet element receiving module 7*i*. Here, in particular a plurality of rivet element receiving modules 7*i* are provided. Here, the rivet element receiving modules 7*i* are of box-like, optionally upwardly open, and/or exchangeable configuration. The rivet elements 3 which are deposited there can then be easily exchanged by the exchange of the rivet element receiving module 7*i*, and/or removed. The bottom of the respective rivet element receiving module 7*i* optionally has a wavelike profile in cross section. In the illustrative embodiment, it is configured in cross section in the style of a triangular wave.

For the recognition of position and alignment of the rivet elements 3 in the temporary store 7*a*, the sensor arrangement 13 can further have an, in particular optical, sensor 7*j*. This optionally detects a plurality of rivet element receiving modules 7*i*.

There can further be provided a transfer sensor 7*g*, which detects the transference of a rivet element 3 to the rivet element receptacle 7 and is optionally constituted by an inductive ring sensor. This here detects the falling of a rivet element 3 into the temporary store 7*a*.

The rivet elements 3 are transported from the rivet element receiving arrangement 6 or the rivet element receptacles 7 to the end effector 2*b* on a transport path. This transport path is here at least partially tube-bound. Here, the transport of the rivet elements 3 is thus realized in a tube 12. In particular, the transport path, at least in the portion from the rivet element receiving arrangement 6 to the adjusting unit 2*a*, is tube-bound. In this latter, the rivet elements 3 are here transported by means of an underpressure and/or an overpressure. In various embodiments, from each of the rivet element receptacles 7 a tube 12 runs to the adjusting unit 2a, optionally to the end effector 2b.

For the positionally secured transport of different rivet elements 3, the temporary stores 7a and/or tubes 12 here have, at least in part, differently large inner diameters.

On the transport path from the rivet element receptacle 7 or the temporary store 7a can further be provided a rivet switch 21, by which various tubes 12 for the transport of rivet elements 3 to the riveting machine 2 can be assigned to a rivet element receptacle 7. To this end, the rivet switch 21 here has a linear drive 22 for the movement of a switch slide 23. Here, the linear drive 22 is configured as an electric motor 24 with a spindle-spindle nut transmission 25.

With this, the switch slide 23 can be moved relative to the rivet element receptacles 7 in order to assign a tube 12 to a respective rivet element receptacle 7.

The production apparatus 1 can further have a sensor arrangement 13, by means of which the control system 11 detects the rivet elements 3. Here, the sensor arrangement 13 has an optical sensor 14, by means of which the control system 11 detects the rivet elements 3. Additionally or alternatively, the sensor arrangement 13 can also have one or a plurality of checking units 15, 16, which are further described in greater detail below. In various embodiments, also the sensor arrangement 13, and hence, where appropriate, the optical sensor 14 or the checking unit 15, 16 is here controlled by the control system 11.

The optical sensor 14 can be arranged above the rivet element providing unit 5, in particular the pick-off region 5c, as is the case in the illustrative embodiment of FIG. 1. In the illustrative embodiment of FIG. 2, the optical sensor 14 is arranged above the there-situated pick-off region 5c. It is here arranged on the rivet element providing unit 4.

The field of detection of the optical sensor 14 can be directed at the pick-off region 5c. The optical sensor 14 can here be disposed in stationary arrangement above the rivet element providing unit 5, in particular the pick-off region 5c, though it can also be fastened to the robot 8. If the rivet element providing arrangement 4 has a plurality of rivet element providing units 5, then, above these, substantially likewise optical sensors 14 can be arranged in the previously described manner.

Preference can be given to a fastening, independent of robot motions, of the optical sensor or sensors 14 above the rivet element providing arrangement 4. This is shown in the illustrative embodiment. Then, parallel to the working motion of the robot 8, the rivet elements 3 can be detected, and their position and/or alignment determined. This applies, in particular, also when the robot 8 is moved out of the field of detection of the optical sensor 14.

In order to improve the detection of the rivet elements 3 in the pick-off region 5c, at least the pick-off region 5c is here illuminated from below. In particular, the pick-off region 5c can to this end have a light-permeable bottom.

By means of the optical sensor 14, the control system 11 in the illustrative embodiment detects the position and/or alignment of the rivet elements 3 in the rivet element providing unit 5, in particular in the pick-off region 5c.

For the picking-off of the rivet elements 3, the control system 11, on the basis of the position and/or alignment of the rivet elements 3, activates the robot 8 to receive, in particular grab, a rivet element 3. By alignment should here be understood the orientation of the longitudinal axis of the rivet element 3, in particular inclusive of the orientation of its head. The robot 8 can then, corresponding to the position and alignment of the rivet element, be adjusted such that its gripper 9 can receive the rivet element 3.

By means of the sensor arrangement 13, in particular the optical sensor 14, the control system 11 can detect the generic type, optionally the type, of a rivet element 3 provided by the rivet element providing unit 5 and lying, in particular, in the pick-off region 5c. In various embodiments, the control system 11 checks whether the type is constituted by a desired type to be filled into one of the rivet element receptacles 7. In this way, only such rivet elements 3 which correspond to the desired type can be fed to a rivet element receptacle 7 or the rivet element receptacles 7.

In various embodiments, those predetermined characteristics of the rivet elements 3, in particular the rivet elements 3 per se, which are relevant to the drilling process and/or riveting process are detected prior to feeding to the end effector 2b, in particular prior to feeding to the rivet element receiving arrangement 6. In various embodiments, the predetermined characteristics which are relevant to the drilling process and/or the riveting process are geometric characteristics of the rivet elements 3, and the control system 11 measures these characteristics by means of a sensor arrangement 13, in particular by means of an optical sensor 14 assigned to the sensor arrangement 13, and/or a checking unit 15, 16 assigned to the sensor arrangement 13. This enables, in the subsequent production of the rivet joint, a coordinated drilling and/or riveting in accordance with the detected characteristics of the rivet element 3, and/or the selection of a rivet element 3, appropriate to a conducted drilling. In particular, head projections of a rivet element 3 beyond a predefined tolerance range can in this way be effectively avoided in the production by means of the production apparatus 1.

Those characteristics of the rivet elements 3 which are relevant to the drilling process and/or riveting process are optionally those characteristics on the basis of which the drilling process and/or riveting process is adapted in a manner specific to the rivet element, in particular for rivet elements 3 of same type, or those characteristics on the basis of which the rivet element 3 is selected over a rivet element 3 of same type for a performed drilling for these same.

Here, those characteristics which are relevant to the drilling process and/or the riveting process can be the rivet length and/or the shank diameter and/or the shank length. These sizes are here detected by the sensor arrangement, in particular the sensor 10 directed at the pick-off region. For the detection of those characteristics of the rivet elements 3 which are to be detected by means of the optical sensor 10, in particular the characteristics rivet length and/or shank diameter and/or shank length, the control system performs a transformation of the optical recording. This is necessary, since, for instance, the rivet heads of the rivet elements 3 here cause a slight tilt in the pick-off region. The measuring tolerance of this measurement lies optionally in the region of at least 500µ, further of at least 200µ, further of at least 100µ.

In various embodiments, the control system 11 checks by means of the sensor arrangement 13, in particular the optical sensor 14, the rivet elements 3 for damage. Here it can be recognized, for instance, whether the head of a rivet element 3 is missing. The detection or checking of the rivet elements 3 by means of the optical sensor 14 directed at the pick-off region 5c can be realized prior to the picking-off of the rivet element 3 by the robot 8.

In addition, the production apparatus 1 can have a checking unit 15 for detecting predetermined characteristics, relevant to the drilling process and/or the riveting process, of the rivet elements 3. The checking unit 15 is here likewise controlled by the control system 11.

In addition, with the checking unit 15, a rivet head diameter and/or a rivet head length and/or an angle of a countersunk rivet head and/or a transition radius, as predetermined characteristics relevant to the drilling process and/or the riveting process, can be gauged and detected. A transition radius is here constituted by a radius between two portions of a rivet element, in particular between head 3c and shank 3d of a rivet 3a. In addition, the shank diameter, where appropriate, can also be determined. The measuring tolerance of the measurement with the checking unit 15 can be smaller, in particular at least by a factor of 10 smaller, than the measuring tolerance in the measurement made with the optical sensor 14 directed at the rivet element providing unit 5.

Moreover, the measurements with the optical sensor 14 directed at the rivet element providing unit 5 and with the checking unit 15 optionally differ by virtue of the fact that, with the optical sensor 14 directed at the rivet element providing unit 5, a plurality of rivet elements 3 are detected simultaneously, and in particular in full, while, with the checking unit 15, optionally only a section of a rivet element 3 is detected.

The checking unit 15 has an optical sensor 17. With the optical sensor 17, predetermined characteristics relevant to the drilling process or the riveting process are detected.

In the illustrative embodiment, here the line of sight A of the optical sensor 14 directed at the rivet element providing unit 5, and the line of sight B of the optical sensor 17 of the checking unit 15, do not run parallel to one another. In various embodiments, they are directed orthogonally to one another. In this way, a testing of the rivet element 3 can be realized from two different sides. Defects of a rivet element 3 which are distinct only on one side can then be better recognized. Moreover, the handling by the robot 8 is hereby simplified, since said robot does not have to change the orientation of the rivet element 3.

In particular, the checking unit 15 can have a lighting 18 for the measurement of the predetermined characteristics relevant to the drilling process and/or the riveting process, which lighting illuminates the rivet element 3 during the detection. The lighting 18 is here arranged opposite the sensor 17 of the checking unit 15. The lighting axis and the line of sight of the optical sensor 17 are, however, optionally arranged coaxially. The direction of view of the sensor 17 and of the lighting 18 are here mutually aligned.

In the illustrative embodiment, the checking unit 15 is configured as a bilaterally telecentric system. This enables an accurate measurement without a precise positioning of the rivet element 3 between the lighting 18 and the optical sensor 17. The measuring tolerance of the checking unit lies optionally below +−5μ, below +−3μ, further substantially at around +−2μ.

In addition, a further testing of the rivet elements 3 can be provided. This is here carried out by a further checking unit 16. The further checking unit 16 optionally has an optical and/or mechanical sensor 19. Depending on those characteristics of the rivet elements 3 which are to be detected, the further checking unit 16 can be configured like the checking unit 15. It can, however, also have a different structure.

For instance, the further checking unit 16 can be provided for the testing of rivet elements 3, in particular rivet collars 3b and/or spacers 3c. The rivet elements 3 can be slipped onto these for testing and/or the rivet elements 3 can be plunged into these. Such a checking unit 16 has proved valuable, in particular for the testing of screw collars and/or of crimping collars. With such a checking unit 16, closing grooves and/or closing threads can be detected and tested, in particular by means of a pattern recognition.

Here, the robot 8 transports the rivet elements 3, in particular individually, from the rivet element providing unit 5 to a checking unit 15, 16 or the checking units 15, 16. In various embodiments, the robot 8 holds the rivet element 3 gripped during the testing or the testing with the checking unit 15, 16 or checking units 15, 16. The inspections are here performed sequentially. Between the checking units 15, 16 too, the rivet element 3 is here transported by the robot 8. Where appropriate, it can be necessary that the robot 8 lays the rivet element 3 down between two checking units 15, 16 and changes its grip (i.e. regrips it). This is in particular sensible when the gripper 9 of the robot 8, due to the size of the rivet element 3, can only grip this such that sizes to be measured are concealed with the gripping. Following testing in the checking unit 15, 16 or checking units 15, 16, the rivet element 3 is here assigned to the rivet element receiving arrangement 6, in particular to a rivet element receptacle 7 of the rivet element receiving arrangement 6.

In various embodiments, the method is configured in such a way that all rivet elements 3 fed to the rivet element receiving arrangement 6 are tested for the predetermined characteristics which are relevant to the drilling process and/or the riveting process. In various embodiments, however, at least 50%, further at least 80%, further at least 95%, of all rivet elements 3 fed to a rivet element receptacle 7 are tested. Accordingly, the method here differs from a batchwise random testing of rivet elements 3 by a rivet manufacturer by virtue of the fact that a significant number of rivet elements 3 are tested by the production apparatus 1, prior to feeding to the rivet element receptacle 7, for redetermined characteristics relevant to the drilling and/or riveting process. In various embodiments, defective rivet elements 3 are detected, and their defects logged, by the control system. The defective rivet elements 3 can optionally be assigned to the outer packaging from which they were removed. This enables a comprehensive complaint management of rivet elements 3 against the manufacturer of the rivet elements 3.

It can further be provided that the detected or tested rivet elements 3 are fed to one of the rivet element receptacles 7 in dependence on the detected characteristics of a rivet element 3. In various embodiments, to at least two of the rivet element receptacles 7 are fed rivet elements 3 of the same type. This is in particular advantageous for the sorting of the rivet elements 3, as described below.

In various embodiments, for the sorting of the rivet elements 3 of one type, sub-categories are formed, and to these sub-categories is assigned, in particular respectively, a rivet element receptacle 7. Additionally or alternatively, on the basis of the information concerning the rivet elements 3, in particular of the specification of the rivet elements 3, sub-categories are formed, and to these sub-categories, in particular respectively, is assigned a rivet element receptacle 7. In dependence on their testing in the checking unit 15, 16, the rivet elements 3 can then be fed, in accordance with their classification into a sub-category, to the rivet element receptacle 7 assigned to this sub-category.

In various embodiments, the sub-categories are formed by tolerance ranges. In this way, a batch sub-distribution of rivet elements 3 into the rivet element receptacles 7 is possible. The rivet elements 3 can thus be sorted by the production apparatus 1 in such a way that the rivet elements 3, in particular stemming from an outer packaging, can be sorted into various smaller tolerance ranges. As a result, to the individual rivet element receptacles 7 are fed by the sorting only rivet elements 3 having an, in their entirety, lesser tolerance range width than the rivet elements 3 fed to the rivet element providing unit 5 originally from an outer packaging.

In this context, it has proved particularly valuable if information concerning the rivet elements 3 fed to a rivet element receptacle 7 or rivet elements 3 to be fed to a rivet element receptacle 7 are linked. In various embodiments, the information, in particular the specification and/or the sub-category, is linked to the rivet element receptacle 7. It can here, in particular, concern a tolerance range. Additionally or alternatively, characteristics, in particular dimensions, of each individual fed rivet element 3, and, where appropriate, the sequence of the feeding, can also, however, be linked to the rivet element receptacle 7. This can be realized in a memory 11a of the control system 11.

On the basis of this information, from amongst various rivet elements 3 of one type there can subsequently be selected, after the gauging of a drill hole, a rivet element 3 for setting into the drill hole, in that a production apparatus 1 requests an appropriate rivet element 3. Additionally or alternatively, the drill hole to be created with the production apparatus 1 can be determined or adapted on the basis of a rivet element 3 to be set—in particular on the basis of its classification into a sub-category, for instance the counter-sinking depth to be drilled can be determined or adapted in dependence on the dimensions of the rivet head. For this, the linked information is retrieved by the production apparatus 1.

Here, the rivet elements 3 are received in aligned, in particular positionally defined arrangement, by the rivet element receptacle or receptacles 7, for instance in a tube 12. It has proved particularly valuable if the supply of rivet elements 3 to the riveting machine from a rivet element receptacle 7 is realized in the same sequence from this rivet element receptacle 7 as the rivet elements 3 were fed to the rivet element receptacle 7.

As is evident from the preceding description and FIG. 1, the rivet element providing arrangement 4, where appropriate the checking units 15, 16, and the rivet element receiving arrangement 6, are chained together, thus, in particular, arranged spatially close together.

The rivet elements 3 are optionally fed by an, in particular fixedly mounted, robot 8 from the rivet element providing unit 5, where appropriate via the checking units 15, 16, to the rivet element receiving arrangement 6. For the transport, a plurality of robots 8 can however, where appropriate, also be provided.

Defective rivet elements 3 are optionally fed to a reject bin 20a. This can be realized, for instance, in a robot-based manner, in particular by means of the robot 8, or else, should the recognition of defective rivet elements 3 be realized in the pick-off region, good rivet elements 3 can be fed by the robot 8 to the rivet element receptacles 7 and, in particular when only defective rivet elements 3 remain in the pick-off region, the rivet elements 3 remaining in the pick-off region are fed by the rivet element providing unit 5, for instance by means of vibrating motions, to a reject bin 20b.

On the basis of the information linked to the rivet element receptacle 7, the production apparatus 1 can adapt the drilling process and/or the riveting process to the rivet element 3 to be set. Additionally or alternatively, for an already drilled and, where appropriate, gauged hole, a suitable rivet element 3 can be requested from the rivet element receptacles 7.

In various embodiments, on the basis of those predetermined characteristics of the rivet elements 3 which are relevant to the drilling process and/or the riveting process and are detected prior to the feeding of the rivet elements 3 to the rivet element receptacle 7, the drilling and/or the riveting is thus conducted, and/or, on the basis of those predetermined characteristics of the rivet elements 3 which are relevant to the drilling process and/or the riveting process and are detected prior to the feeding of the rivet elements 3 to the rivet element receptacle 7, a suitable rivet element 3 is requested and a rivet joint produced for a drill hole.

Of particular importance is here, in particular, the gauging of the heads of the rivet elements 3 and the adaptation of the drill hole, in particular of the countersink onto the head of the rivet element 3, or the selection of a rivet element 3 having a suitable head for a drill hole, in particular the countersinking of a drill hole. According to various embodiments of the method, the production apparatus 1 detects, for instance as predetermined characteristics of the rivet elements 3 which are relevant to the drilling process and/or the riveting process, the rivet head diameter and/or the rivet head length prior to feeding to the rivet element receptacle. Moreover, it is provided that the production apparatus 1, on the basis of the rivet head diameter and/or the rivet head length, determines and conducts the drilling, in particular determines and conducts the countersinking depth for the drilling.

Finally, in FIG. 2 are shown, as an example of the rivet elements 3, in a) a solid rivet with countersunk head, and in b) a calibrated rivet with countersunk head and a rivet collar 3b corresponding to the calibrated rivet. Furthermore, many further rivet elements 3 can also be fed with the production apparatus 1 to rivet element receptacles 7 in the same way. These can be, in particular, also screw rivets and/or blind rivets.

For the rivet elements 3 shown in FIG. 2 are shown by way of example, for the drilling process and/or the riveting process, possible relevant characteristics, wherein a selection from these can respectively depend on the requirements with regard to the rivet joint to be created. The relevant characteristics are here the rivet length $L_N$ and/or the shank length $L_S$ and/or the head length $L_K$ and/or the head diameter $D_K$ and/or the shank diameter $D_S$. These are dimensioned in FIG. 2. In addition, the countersunk head angle W and the transition radius R are indicated as possible characteristics relevant to the drilling process and/or the riveting process. Furthermore, a rivet structure, namely the closing grooves 3e of the calibrated rivet, is shown in FIG. 2b).

For the rivet collar 3b, are here shown, as characteristics relevant to the riveting process, the rivet collar length $L_C$, and also the rivet collar inner diameter $D_{CI}$ and rivet collar outer diameter $D_{CA}$.

The invention claimed is:

1. A method for supplying a riveting machine with rivet elements,
   wherein at least one rivet element providing arrangement comprising at least one rivet element providing unit for providing and separating the rivet elements is provided,
   wherein the riveting machine has a rivet element receiving arrangement comprising at least one rivet element receptacle for directly receiving the rivet elements,
   wherein at least a part of the transport from one of the rivet element providing units to one of the rivet element receptacles is realized in a robot-based manner,
   wherein the riveting machine has an adjusting unit having an end effector with a riveting tool and the riveting tool sets the rivet element and wherein the rivet elements are transported from the rivet element receiving arrangement to the end effector on a transport path, wherein the transport path is at least partially tube-bound.

2. The method as claimed in claim 1, wherein the rivet elements are transported from one of the rivet element providing units to one of the rivet element receptacles by a robot having at least two or at least three axes.

3. The method as claimed in claim 1, wherein the end effector has a drilling tool and a riveting tool, and the drilling tool drills a hole into a structural component and the riveting tool sets a rivet element into the drilled hole.

4. The method as claimed in claim 1, wherein the rivet element providing unit has a spiral conveyor, by which the rivet elements are fed to a pick-off region, wherein the spiral conveyor has a spiral and a longitudinal axis, about which the spiral extends.

5. The method as claimed in claim 1, wherein the rivet elements in the rivet element providing unit are separated and fed to a pick-off region.

6. The method as claimed in claim 1, wherein the supplying of a riveting machine with rivet elements is controlled by a control system, wherein the control system, by a sensor arrangement, detects the rivet elements, wherein the control system, by an optical sensor, detects the position and/or alignment of the rivet elements in one of the rivet element providing units.

7. The method as claimed in claim 6, wherein the control system, by the sensor arrangement detects the type of a rivet element provided by the rivet element providing unit, wherein the control system checks whether the detected type is constituted by a desired type to be fed to one of the rivet element receptacles.

8. The method as claimed in claim 1, wherein predetermined characteristics, relevant to a drilling process and/or a riveting process, of the rivet elements are detected prior to feeding to the rivet element receiving arrangement.

9. The method as claimed in claim 8, wherein one of the characteristics relevant to the drilling process and/or the riveting process, is the rivet length and/or the shank diameter and/or the shank length.

10. The method as claimed in claim 6, wherein the control system, by the sensor arrangement checks the rivet elements for damage.

11. The method as claimed in claim 4, wherein a chute is provided, over which the rivet elements slide to the pick-off region, wherein, by a rotation of the spiral, a rivet element is fed, by discharging of this same and sliding over the chute, from the spiral conveyor to the pick-off region.

12. The method as claimed in claim 1, wherein the at least one rivet element providing arrangement comprises at least two rivet element providing units for providing and separating the rivet elements.

* * * * *